ns Patent Office 3,049,510
Patented Aug. 14, 1962

3,049,510
6-DIHYDROQUINOLINYL POLYETHERS AND AMINOETHERS
James O. Harris, St. Albans, W. Va.
No Drawing. Filed May 26, 1960, Ser. No. 31,817
16 Claims. (Cl. 260—45.8)

This invention relates to a new class of compounds and more particularly to 6-dihydroquinolinyl polyethers and aminoethers and to a method for perservation of rubber and especially to prevention of exposure cracking.

Rubber deteriorates upon aging and it has long been known as age resistors or antioxidants. Surface cracking treatment before or after vulcanization with substances known as age resistors or antioxidants. Surface cracking was soon recognized to be an independent phenomenon. It was initially assumed to result from action of ultra violet light but it is now known that ozone is one of the major causes. Because styrene-butadiene copolymer is more susceptible to surface cracking than natural rubber its widespread use has intensified the problem. Surface cracking accelerates greatly when the rubber is under strain. Unfortunately, efficient antioxidants are not necessarily effective for preventing exposure cracking.

Preventing exposure cracking requires presence of the inhibitor on the surface of the rubber. Indeed, waxed coatings are widely used and are effective if nothing disturbs or breaks the protective film during service. Similarly, chemical catalytic inhibition is believed to require continuous presence of inhibitor at the rubber surface. Ability to migrate through the rubber has been postulated to be required for preventing exposure cracking. This view has been supported by the observation that adjuvants which are known from experience to prevent exposure cracking migrate readily and are often quite volatile. Migration and volatility are not unmixed blessings, however, because they result in gradual loss of protection. An antidegradant of fugitive nature has only limited use. Moreover, the antidegradant may exert a detrimental effect on other objects with which it comes in contact.

An object of this invention is to provide compounds which inhibits both degradation caused by ozone and degradation due to heat, aging and oxidation. A further object is to provide new dihydroquinolines of reduced volatility and migration but of undiminished effectiveness as compared to dihydroquinolines heretofore used. A further object is to provide rubber articles both natural and synthetic, vulcanized and unvulcanized, which resist deteriorating influence of air, ozone, oxygen, heat, light, aging and flexing for extended periods. A still further object is to provide high molecular weight antidegradants which can be economically manufactured by existing procedures from readily available raw materials. Further objects will in part be apparent and in part pointed out in the detailed description following.

The antidegradants of the present invention may be represented by the general formula

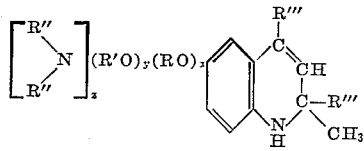

where $x$ is 1, 2 or 3, $z$ and $y$ are unlike integers selected from 0 and 1, R is an alkylene radical of 2–8 carbon atoms, preferably 2 or 3 carbon atoms, R' is phenyl, alkylphenyl, cyclohexyl or alkyl radical of 1 to 6 carbon atoms inclusive and R'' and R''' are the same or different alkyl radicals of 1 to 4 carbon atoms inclusive. These compounds form by condensing the corresponding anilines with ketones as for example acetone, methyl ethyl ketone, methyl isopropyl ketone and methyl isobutyl ketone. Suitable catalyst for the condensation include iodine, benzene sulfonic acid, toluene sulfonic acid and other dehydration catalysts. The minor proportion of by-products which form need not be separated and may even contribute antidegradant properties. In general, the products are distillable and where pure products are desired they may be obtained by fractional distillation of composite reaction mixture.

Substituted anilines suitable as intermediates have been described and others may be obtained by comparable procedures. Condensation of equimolar proportions of potassium p-nitrophenate with 1,3-dibromopropane yields 3-(p-nitrophenoxy)propylbromide which in turn condenses with aliphatic alcohol, ethyl alcohol, cyclohexyl alcohol, phenol, or dialkylamine to yield, after reduction, substituted anilines suitable as intermediates. Alternatively, p-nitrochlorobenzene condenses with ether alcohols at elevated temperature in presence of water and alkali metal hydroxide. The conditions described by Welty, U.S. Patent No. 1,578,943, Welty et al. U.S. Patent No. 1,619,368 and Clemmensen U.S. Patent No. 1,875,916 are suitable for this reaction which is especially efficient for reacting water soluble ether alcohols. Other standard chemical procedures are available and well known. The invention is not concerned with substituted anilines per se but with 6-dihydroquinolinylpolyethers and aminoethers. Typical examples of

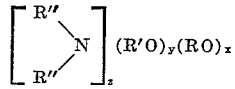

radicals include the following:

$CH_3OC_2H_4O-$, $C_2H_5OC_2H_4O-$ $C_4H_9OC_2H_4O-$
$(C_2H_5)_2CH.CH_2OC_2H_4O-$, $C_6H_{13}OC_2H_4O-$
$C_6H_5OC_2H_4O-$, $CH_3OC_2H_4OC_2H_4O-$
$CH_3O(C_2H_4O)_2-$, $C_2H_5O(C_2H_4O)_2-$
$C_4H_9O(C_2H_4O)_2-$, $C_2H_5O(C_2H_4O)_3-$
$C_6H_{13}O(C_2H_4O)_2-$

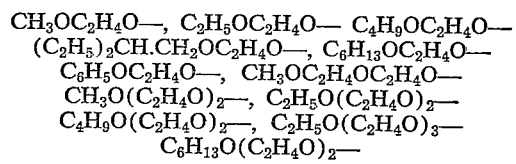

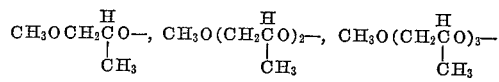

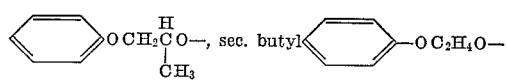

$(C_2H_5)_2NC_2H_4O-$, $(CH_3)_2NC_2H_4O-$

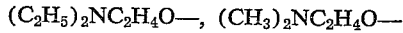

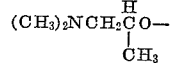

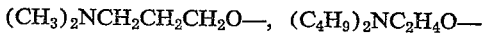

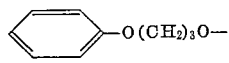

cyclohexyl-O(CH$_2$)$_3$O—, CH$_3$O(CH$_2$)$_4$O—

CH$_3$O(CH$_2$)$_5$O—, CH$_3$O(CH$_2$)$_6$O—, CH$_3$O(CH$_2$)$_7$O— and CH$_3$O(CH$_2$)$_8$O—.

Methods heretofore used for condensation of aniline and substituted aniline with ketones are applicable for preparation of the antidegradants. The preparation and results to be expected are hereinafter described in detail but it will be understood that these are simply illustrative.

EXAMPLE 1

Into a 500 ml. flask reactor fitted with stirrer, condenser, water trap and inlet line was charged 104.5 grams (0.5 mole) of 1-(4-aminophenoxy)-2-n-butoxyethane, B.P. 130–133° C. at 0.4 mm. pressure together with 4.9 grams of toluene sulfonic acid. The reaction mixture was heated to 130° C. and acetone fed in at a rate of about 3.3 ml. per minute in the form of vapor. Over a period of about 6 and one-half hours 28 ml. of water were collected. Low boiling constituents were removed from the product by heating for 23 minutes at 138–148° C. under the reduced pressure obtained with a water aspirator. The residue was 159 grams of a dark amber oil which was an efficient antidegradant. A portion was transferred to a distillation flask and distilled through an 18 inch column under reduced pressure. The fraction distilling at 186–191° C. at 1.5 mm. pressure was collected. It contained 4.8% nitrogen which is the calculated value for C$_{18}$H$_{27}$NO$_2$. 6-butoxyethoxy 1,2-dihydro-2,2,4-trimethylquinoline so obtained was a straw colored liquid very soluble in common organic solvents including benzene, acetone, ether, ethanol, ethyl acetate, chloroform and heptane but insoluble in water.

EXAMPLE 2

Into the reactor described in Example 1 was charged 100 grams (0.473 mole) of diethylene glycol methyl (4-aminophenyl) ether, B.P. 138–140° C. at 0.3 mm. pressure together with 4.55 grams of toluene sulfonic acid. The mixture was heated to 130° C. and acetone fed in at a rate of about 3.2 ml. per minute in form of vapor. Over a period of about 8 hours, 24 ml. of water were collected. Low boiling constituents were removed by heating at 130–137° C. for 20 minutes under the reduced pressure obtained by a water aspirator. The dark amber residue weighed 155.5 grams. Testing demonstrated that it was an efficient antidegradant only slightly inferior to a product purified by distillation as follows: 115 grams were distilled through an 18 inch column at diminshed pressure. The fraction distilling at 206–209° C. at 2 mm. pressure was collected. It was a straw colored liquid which contained 4.9% nitrogen as compared to 4.8% nitrogen calculated for 1,2-dihydro-6-(methoxyethoxy-ethoxy)-2,2,4-trimethylquinoline, C$_{17}$H$_{25}$NO$_3$.

As a specific embodiment of the invention illustrating the antidegradant properties, a rubber base composition was compounded comprising:

| | Base stock A, parts by weight |
|---|---|
| Smoked sheets rubber | 100 |
| Carbon black | 50 |
| Zinc oxide | 5 |
| Stearic acid | 3 |
| Sulfur | 2.5 |
| Saturated hydrocarbon softener | 3 |
| N-cyclohexyl-2-benzothiazolesulfenamide | 0.5 |

To the base composition was added 1.5 parts by weight of antidegradant and the composition cured by heating 45 minutes at 144° C. The stocks were then aged under various conditions and the proportion of the original tensile strength retained after aging observed. In the results recorded below, test tube aging refers to results by the test tube method A.S.T.M. designation D–865–57, A.S.T.M. Standards, 1958, p. 1453.

Table I

| Antidegradant | Percent Retention of Ultimate Tensile Strength | | | |
|---|---|---|---|---|
| | Test Tube Aging | | Air Bomb Aging, 4 Hrs./ 121° C. Under 80# air pressure/in.² | Oxygen Bomb Aging, 5 days/70° C. under 300# oxygen/in.² |
| | 48 Hrs. at 100° C. | 72 Hrs. at 100° C. | | |
| None | 16 | 13 | 21 | Embrittled |
| 1,2-Dihydro-6-(methoxy-ethoxyethoxy)-2,2,4-trimethyl-quinoline | 38 | 30 | 38 | 46 |
| Same, undistilled | 35 | 25 | 33 | 43 |
| 6-(Butoxyethoxy) 1,2-dihydro-2,2,4-trimethylquinoline | 45 | 35 | 37 | 47 |
| Same, undistilled | 38 | 24 | 42 | 52 |

These data demonstrate that the new antidegradants prevent deterioration by air or oxygen.

To demonstrate anti-exposure cracking properties, tests were conducted in the above-described natural rubber base stock A and in rubber base stocks comprising:

| | Base Stock B | Base Stock C |
|---|---|---|
| | Parts by weight | |
| Pale crepe rubber | 100 | |
| SBR 1500 rubber | | 100 |
| Carbon black | | 50 |
| Titanium dioxide | 50 | |
| Zinc oxide | 25 | 4 |
| Clay | 15 | |
| Stearic acid | 1 | 2 |
| Sulfur | 3 | 1.75 |
| 2,2'-Dithiobis benzothiazole | 0.6 | |
| Diphenylguanidine | 0.15 | |
| Saturated hydrocarbon softener | | 10 |
| N-Cyclohexyl-2-benzothiazole-sulfenamide | | 1 |

SBR 1500 is styrene-butadiene copolymer rubber, the bound styrene content of which is 23.5%. Antioxidant is added but this has no significant effect in preventing exposure cracking. The stocks compounded from the stock B were cured by heating in a press 45 minutes at 144° C. and those from base stock C by heating in a press for 60 minutes at 144° C. Since evaluation under static conditions is not indicative of the service obtained with many types of rubber articles which must withstand flexing, the vulcanized compositions were evaluated under dynamic conditions in an atmosphere containing a definite concentration of ozone. The test was carried out in the following manner: Samples of the stocks were cured in the form of a belt ½ inch wide, ¼ inch thick and 5%16 inches inside diameter and mounted on 1 inch diameter shafts. The ozone concentration was maintained at 20–30 parts per hundred million throughout the test and the shafts rotated at 75 R.P.M. In this manner a momentary elongation through a range of 0–20% was provided at any portion of the test specimens passing over the shaft. Further details of the apparatus and procedure employed were described by Creed et al. in Analytical Chemistry, vol 25, page 241, February 1953. The test specimens were compared visually to previously selected standards at regular intervals, noting the extent of cracking. The standards represented different degrees of cracking on a numerical scale of 1–6 on which 1 represented no cracking and 6 extremely severe cracking. Severity of cracking was assigned numerical rating in this manner. By plotting the severity of cracking on the Y axis in inverse order versus time of exposure on the X axis, curves were obtained which related severity of cracking and time. Comparative results were obtained by determining and comparing the areas under the curves. The results were expressed on the basis of the blank or unprotected stock as 100. Thus a value of 200 means that the area under the above-described curve was twice that of the unprotected stock.

Table II

| Antidegradant | Amount, Parts by weight | Protection Rating Against Ozone | | |
|---|---|---|---|---|
| | | Natural Rubber | | Styrene-Butadiene Copolymer Rubber Base C |
| | | Base A | Base B | |
| None | None | 100 | 100 | 100 |
| 1,2-Dihydro-6-(methoxyethoxy-ethoxy)-2,2,4-trimethylquinoline | 1.5 | 193 | 216 | 141 |
| | 3.0 | | | 208 |
| Same, undistilled | 1.5 | 187 | | 133 |
| | 3.0 | | | 208 |
| 6-(Butoxyethoxy)-1,2-dihydro-2,2,4-trimethylquinoline | 1.5 | 193 | 284 | 154 |
| | 3.0 | | | 232 |
| Same, undistilled | 1.5 | 171 | 259 | 133 |
| | 3.0 | | | 217 |

Stress relaxation measurements afforded another important demonstration of antidegradant properties. A weight was affixed to one end of a cured strip of rubber, the other end of which was maintained in fixed position. Gradual relaxation of stress was followed by periodically measuring the elongation. The time for elongation to increase 100% was recorded. This test, commonly referred to as creep test, furnishes a reliable indication of fugitiveness of an antidegradant. The applied loads were 60 pounds per square inch and 45 pounds per square inch respectively to base stocks A and B. In each case the amount of antidegradant was 1.5 parts by weight. As a control, commercial antidegradant 1,2-dihydro-6-ethoxy-2,2,4-trimethylquinoline was used.

Table III

| Antidegradant | Creep—Hours to 100% increase in Elongation | |
|---|---|---|
| | Base A | Base B |
| None | 24 | 22 |
| 1,2-Dihydro-6-ethoxy-2,2,4-trimethylquinoline | 30 | 39 |
| 1,2-Dihydro-6-(methoxyethoxyethoxy)-2,2,4-trimethylquinoline | 32 | |
| Same, undistilled | 32 | 42 |
| 6-(Butoxyethoxy)-1,2-dihydro-2,2,4-trimethylquinoline | 32 | 51 |
| Same, undistilled | 32 | 47 |

The new antidegradants were added to styrene-butadiene copolymer rubber (SBR 1500, 23.5% bound styrene, 19.9 solids but from which antioxidant had been omitted) employing 1.2 parts per 100 of the rubber hydrocarbon. The test materials were incorporated into the rubber by milling at 50° C. Samples of the products were then aged in a circulating air oven at 100° C. for the indicated times. The viscosity of the specimens was determined before and after aging by a Mooney plastometer (Melvin Mooney, Industrial and Engineering Chemistry, Analytical Edition, March 14, 1934, pages 147–151), following A.S.T.M. Method D–927. The viscosity of the unstabilized copolymer increases rapidly upon aging whereas the stabilized product forms no resinous skin and retains a viscosity close to that of the unaged specimens. The differences between viscosities before and after aging are a measure of the stabilizing action, little or no increase indicating high activity. Phenyl-beta-naphthylamine, widely used commerically for stabilizing SBR rubber, was employed as a control. The results follows:

Table IV

| Antidegradant | Mooney Viscosity After Aging | | | |
|---|---|---|---|---|
| | 0 Hrs. | 8 Hrs. | 24 Hrs. | 48 Hrs. |
| None | 49 | | 151 | 178 |
| Phenyl-beta-naphthylamine | 44 | 43 | 45 | 53 |
| 6-(Butoxyethoxy)-1,2-dihydro-2,2,4-trimethylquinoline | 45 | 34 | 43 | 55 |
| Same, undistilled | 45 | 39 | 42 | 46 |
| 1,2-Dihydro-6-(methoxyethoxy)-2,2,4-trimethylquinoline | 46 | 37 | 42 | 52 |
| Same, undistilled | 46 | 40 | 42 | 47 |

The new dihydroquinolines may be used for the protection of different kinds of rubber than those particularly mentioned above. They may be employed for the protection of natural rubber in its various forms, as for example latex, crepe, smoked sheets, gutta-percha, balata and cyclo rubbers. They applicable generally for protection of natural and synthetic elastomers which deteriorate by absorbing oxygen and ozone from the atmosphere, as for example polybutadiene, polyisoprene and polyisobutylene polymerized with a small proportion of a diolefin. They are useful for protecting unvulcanized as well as vulcanized rubber. As illustrated, the antidegradants may be added with advantage to styrene-butadiene rubber at the time of manufacture. The protection then persists throughout storage, compounding, curing and service of the rubber article.

The amounts used in the rubber will vary depending upon the particular stock and purpose of the compounder. In general, amounts within the range of 0.1–5 parts encompass the range normally used. In case of massed rubber the antidegradant will ordinarily be incorporated by milling or similar mixing and masticating procedure but applying to the surface of rubber is also effective.

It is intended to cover all changes and modifications of the examples of the invention herein chosen for purposes of disclosure which do not constitute departures from the spirit and scope of the invention.

What is claimed is:

1. A compound of the structure

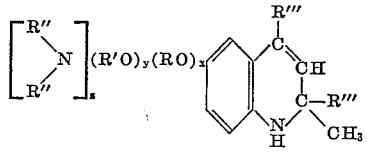

where $x$ is an integer from 1 to 3 inclusive, $y$ and $z$ are unlike integers selected from 0 and 1, R is an alkylene radical of 2 to 8 carbon atoms inclusive, R' is selected from a group consisting of alkyl radicals of 1 to 6 carbon atoms inclusive, phenyl, alkylphenyl and cyclohexyl, R'' is alkyl of 1 to 4 carbon atoms inclusive and R''' is alkyl of 1 to 4 carbon atoms inclusive.

2. A compound of the structure

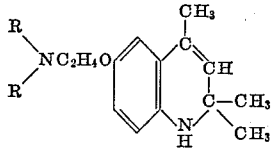

where R is an alkyl group of 1 to 2 carbon atoms inclusive.

3. A compound of the structure

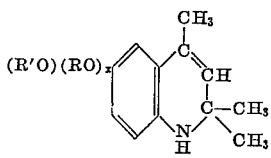

where $x$ is an integer of 1 to 3 inclusive, R is an alkylene radical of 2 to 3 carbon atoms inclusive and R' is an alkyl radical of 1 to 6 carbon atoms inclusive.

4. A compound of the structure

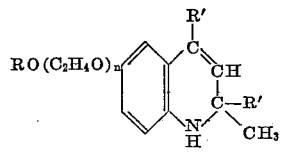

where R is alkyl of 1 to 6 carbon atoms inclusive, $n$ represents an integer from 1 to 3 inclusive and R' represents an alkyl radical of 1 to 4 carbon atoms inclusive.

5. A compound of the structure

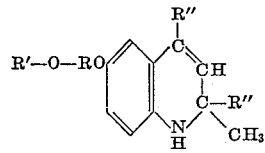

where R is an alkylene radical of 2 to 3 carbon atoms inclusive and R' and R'' are alkyl radicals of 1 to 6 carbon atoms inclusive.

6. 1,2-dihydro - 6 - (methoxyethoxyethoxy) - 2,2,4 - trimethylquinoline.

7. 6-(butoxyethoxy)-1,2 - dihydro-2,2,4-trimethylquinoline.

8. A sulfur vulcanizable rubber composition containing a small amount sufficient to inhibit oxidative degradation and atmospheric cracking by ozone of a compound of the structure

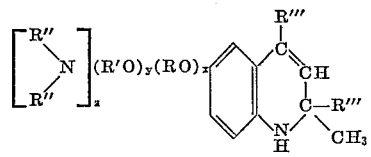

where $x$ is an integer from 1 to 3 inclusive, $y$ and $z$ are unlike integers selected from 0 and 1, R is an alkylene radical of 2 to 8 carbon atoms inclusive, R' is selected from a group consisting of alkyl radicals of 1 to 6 carbon atoms inclusive, phenyl, alkylphenyl and cyclohexyl, R'' is alkyl of 1 to 4 carbon atoms inclusive and R''' is alkyl of 1 to 4 carbon atoms inclusive.

9. A sulfur vulcanizable rubber composition containing a small amount sufficient to inhibit oxidative degradation and atmospheric cracking by ozone of a compound of the structure

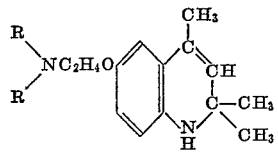

where R is an alkyl group of 1 to 2 carbon atoms inclusive.

10. A sulfur vulcanizable rubber composition containing a small amount sufficient to inhibit oxidative degradation and atmospheric cracking by ozone of a compound of the structure

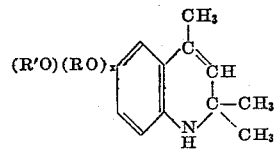

where $x$ is an integer of 1 to 3 inclusive, R is an alkylene radical of 2 to 3 carbon atoms inclusive and R' is an alkyl radical of 1 to 6 carbon atoms inclusive.

11. A sulfur vulcanizable rubber composition containing a small amount sufficient to inhibit oxidative degradation and atmospheric cracking by ozone of a compound of the structure

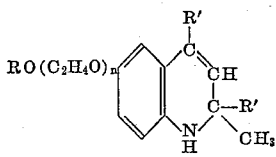

where R is alkyl of 1 to 6 carbon atoms inclusive, $n$ represents an integer from 1 to 3 inclusive and R' represents an alkyl radical of 1 to 4 carbon atoms inclusive.

12. A sulfur vulcanizable rubber composition containing a small amount sufficient to inhibit oxidative degradation and atmospheric cracking by ozone of a compound of the structure

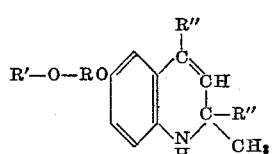

where R is an alkylene radical of 2 to 3 carbon atoms inclusive and R' and R'' are alkyl radicals of 1 to 6 carbon atoms inclusive.

13. A sulfur vulcanizable rubber composition containing a small amount sufficient to inhibit oxidative degradation and atmospheric cracking by ozone of 1,2-dihydro-6-(methoxyethoxyethoxy)-2,2,4-trimethylquinoline.

14. A sulfur vulcanizable rubber composition containing a small amount sufficient to inhibit oxidative degradation and atmospheric cracking by ozone of 6-(butoxyethoxy)-1,2-dihydro-2,2,4-trimethylquinoline.

15. The composition of claim 11 wherein the rubber is natural rubber.

16. The composition of claim 11 wherein the rubber is styrene-butadiene copolymer rubber.

References Cited in the file of this patent

UNITED STATES PATENTS

| | | |
|---|---|---|
| 2,748,100 | Harris et al. | May 29, 1956 |
| 2,805,212 | Beaver et al. | Sept. 3, 1957 |
| 2,832,749 | Harris | Apr. 29, 1958 |

UNITED STATES PATENT OFFICE
CERTIFICATE OF CORRECTION

Patent No. 3,049,510                                                       August 14, 1962

James O. Harris

It is hereby certified that error appears in the above numbered patent requiring correction and that the said Letters Patent should read as corrected below.

In the grant, lines 1 to 3, for "James O. Harris, of St. Albans, West Virginia," read -- James O. Harris, of St. Albans, West Virginia, assignor to Monsanto Chemical Company, of St. Louis, Missouri, a corporation of Delaware, --; line 12, for "James O. Harris, his heirs" read -- Monsanto Chemical Company, its successors --; in the heading to the printed specification, line 4, for "James O. Harris, St. Albans, W. Va." read -- James O. Harris, St. Albans, W. Va., assignor to Monsanto Chemical Company, St. Louis, Mo., a corporation of Delaware --.

Signed and sealed this 18th day of December 1962.

SEAL)
Attest:

ERNEST W. SWIDER                                        DAVID L. LADD
Attesting Officer                                             Commissioner of Patents